United States Patent Office 3,292,254
Patented Dec. 20, 1966

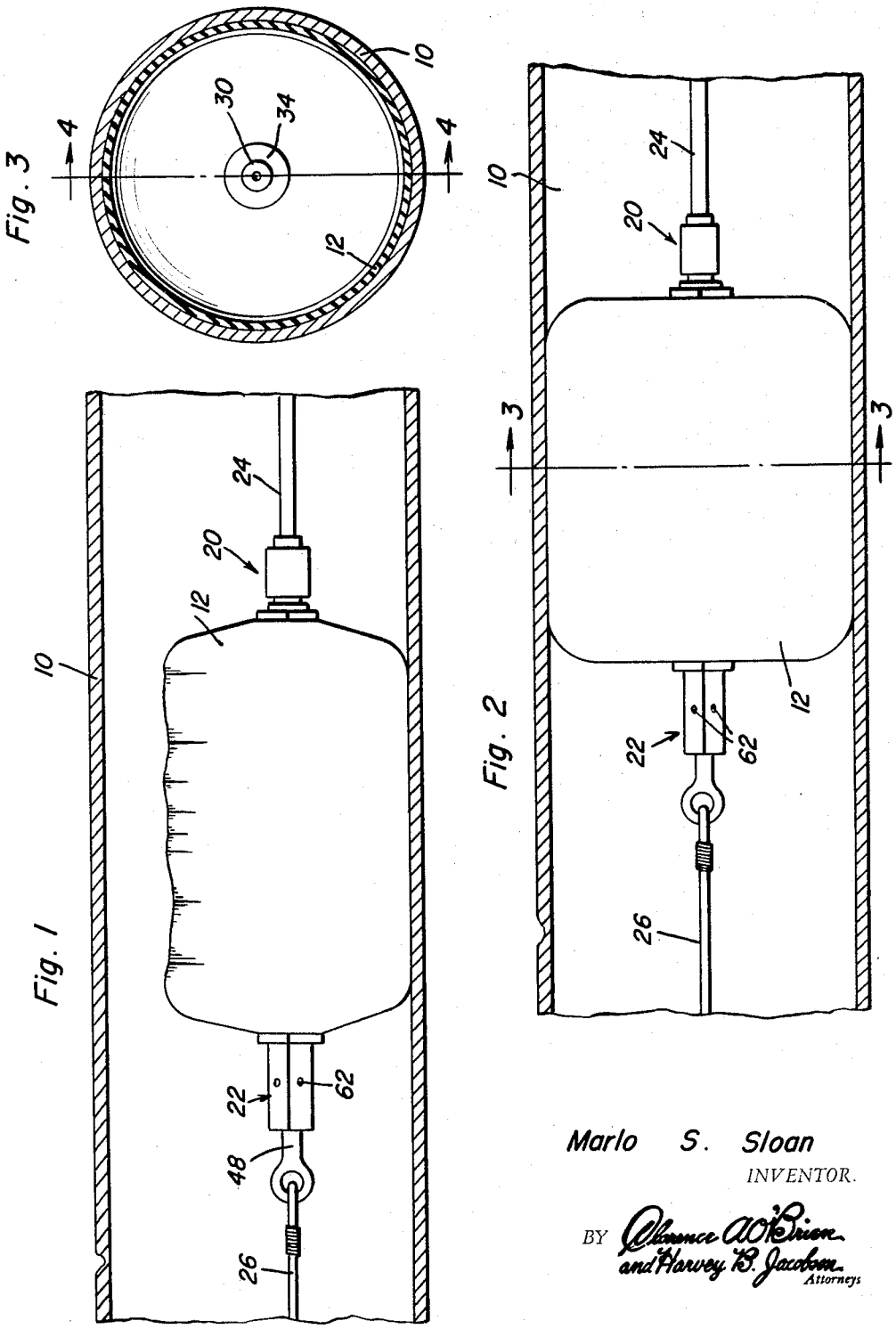

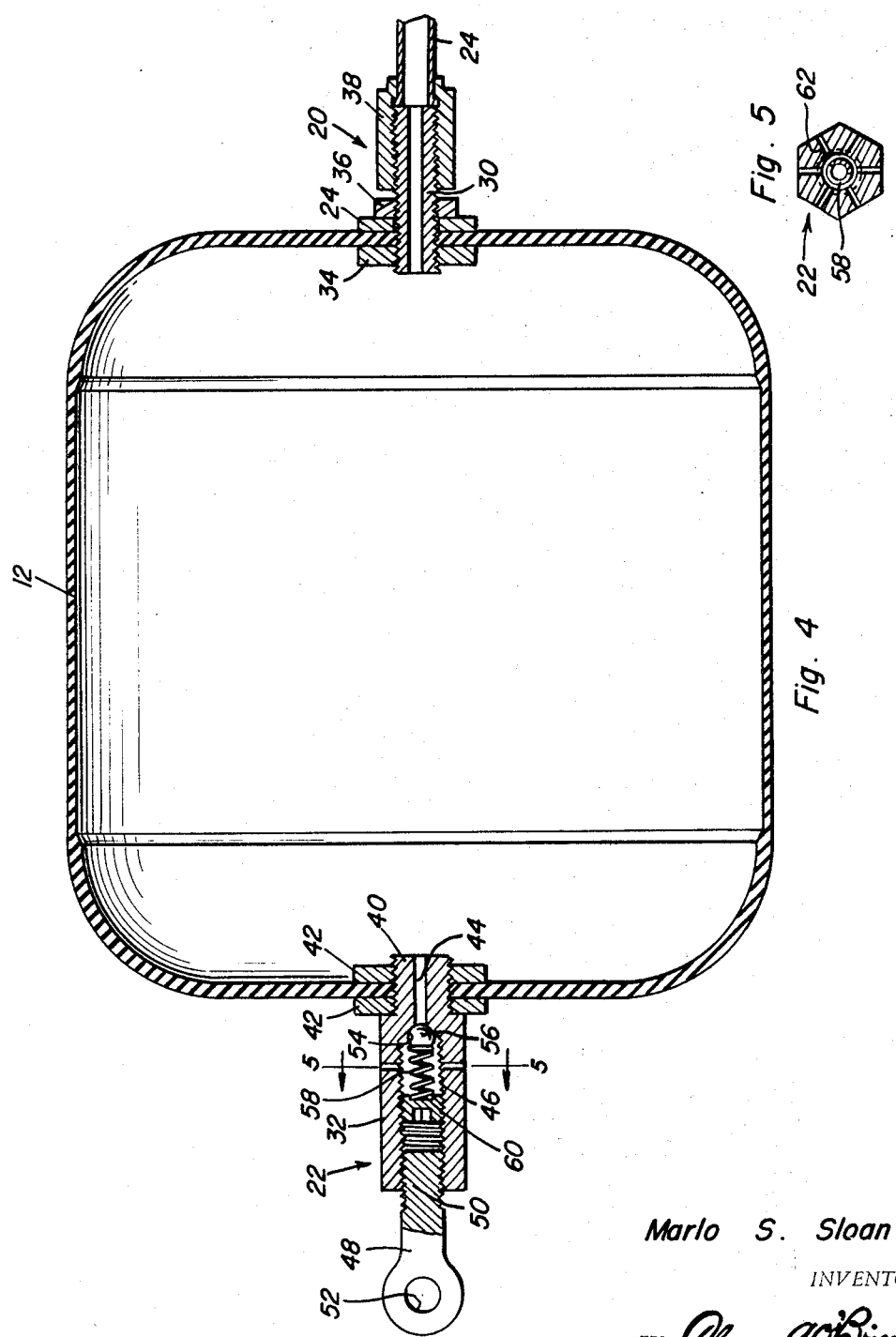

3,292,254
INFLATABLE WELDING PURGING DEVICE
AND METHOD
Marlo S. Sloan, Bakersfield, Calif., assignor of thirty-three and one-third percent to Paul E. Griffiths, Bakersfield, Calif.
Filed Dec. 10, 1963, Ser. No. 329,572
10 Claims. (Cl. 29—494)

This invention comprises a novel and useful inflatable welding purging device and method and more particularly pertains to a means and a method for facilitating and rendering more economical the welding of hollow bodies which require the presence of an inert purging gas in the hollow body at the area to be welded.

In the welding of hollow bodies and particularly in the welding of the abutting ends of sections of a pipe or hollow casing or the closing by welding of openings in a pipe or casing, it is conventional practice to supply an inert purging gas of a suitable character to the interior of the body and at the area to be welded to prevent oxidation of the metal at the area of the weld and for other purposes. However, this practice usually occasions the loss of a considerable volume of the inert purging gas or, to prevent such loss, requires the provision of inserted and subsequently removed sealing means to confine the purging gas to the immediate area of the weld. The various methods heretofore employed for this purpose have usually been expensive, time-consuming in their application and result in a considerable wastage of the inert purging gas.

It is therefore the primary purpose of this invention to provide a purging device and a method which will greatly economize the use of the purging gas and may be quickly and easily applied into the hollow body to be welded at the area of the weld.

A further object of the invention is to provide a device and a method whereby an inflatable or radially expansible sealer may be easily moved through the hollow body to a desired location adjacent the area to be welded, may then be inflated by a purging gas to seal off the area to be welded from one end of the hollow body and whereby an inert purging gas may then be discharged from the sealer into the space in the hollow body adjacent the area to be welded.

A further object of the invention is to provide an inflatable gas-impervious pliable bag having at its opposite ends a pair of fittings one of which is connected to a conduit means for supplying an inert purging gas to the interior of the bag for inflating the latter while the fitting at the other end is utilized both to attach a cable or other moving means to the bag for positioning it in the hollow body and also as the housing of a discharge valve assembly whereby the inert purging gas may be discharged from the interior of the bag into the hollow body at the area to be welded.

A further object of the invention is to provide a purging device and a method for using the latter wherein an inflatable bag or sealing element is positioned in a pipe or other hollow body adjacent an area to be welded, is then inflated by introducing thereinto a purging gas under a predetermined maximum pressure, and whereby provision is made to discharge purging gas from the sealing bag into the area to be welded continuously by increasing the pressure of the gas above the desired maximum pressure within the bag.

These together with other objects and advantages which will become subsequently apparent reside in the details of construction and operation as more fully hereinafter described and claimed, reference being had to the accompanying drawings forming a part hertof, wherein like numerals refer to like parts throughout, and in which:

FIGURE 1 is a view in vertical central section through a portion of a pipe or other hollow body, a part of which is broken away, and showing the manner in which the purging device of this invention in its deflated condition is moved and positioned in the pipe adjacent the area to be welded;

FIGURE 2 is a view similar to FIGURE 1 but showing the inflatable sealing device radially expanded into sealing position to form a partition in the hollow body adjacent the area to be welded;

FIGURE 3 is a vertical transverse sectional view taken substantially upon the plane indicated by the section line 3—3 of FIGURE 2;

FIGURE 4 is a view upon an enlarged scale in vertical longitudinal section taken substantially upon the plane indicated by the section line 4—4 of FIGURE 3 and showing the internal construction of the inflatable sealer and the connections thereto; and, FIGURE 5 is a vertical transverse sectional view taken substantially upon the plane indicated by the section line 5—5 of FIGURE 4 and showing the discharge port arrangement of the discharge means for the purging gas.

In the accompanying drawings, the numeral 10 designates generally any hollow body or casing upon which a welding operation is to be applied, as for example a pair of abutting casing sections whose abutting joint is to be welded together. Inasmuch as the invention may be applied to other objects than pipes or casings, the term "hollow body" has been used throughout the specification and claims as a generic term covering all such hollow bodies to which this invention may be applied.

The numeral 12 indicates an inflatable radially expansible sealing device, sealer or inflatable bag and which is preferably of a gas-impervious material. Insofar as the principles of this invention in their broad aspect are concerned, any other radially expansible sealing device may be employed. The function of this device is to be readily movable and maneuverable in the casing in its deflated condition as shown in FIGURE 1 to a desired position adjacent an area to be welded. The sealer is then inflated by the application of pressure internally thereof until it is expanded into a sealing condition with the wall of the hollow body to form a partition therein dividing the hollow body into two portions, one of which contains at one side of the sealer the area to be welded.

A pair of fittings indicated generally by the numerals 20 and 22 are connected to opposite ends of the inflatable sealer 12 at what may be termed the rear and forward ends thereof respectively. These fittings communicate with the interior of the inflatable sealer, the fitting 20 also being connected with and communicating a conduit means 24 with the interior of the inflatable sealer 12 by means of which a source of an inert gas, not shown, under suitable pressure is delivered by suitable control valve means, not shown, to the interior of the inflatable sealer. The conduit means 24 preferably comprises a flexible hose or conduit and which may conveniently extend through an opening through the hollow body 10 in that compartment thereof which is separated from the area to be welded by the inflated sealer.

The fitting 22 serves the dual functions of providing a gas discharge means by which purging gas is discharged into the compartment of the hollow body which is adjacent to the area to be welded, and also serves as a means for connecting a moving means 26 to the inflatable sealer 12. The moving means may comprise either a tensioning element such as a steel cable or the like or a rigid element such as a rod or pipe.

Referring now to FIGURE 4 in particular, it will be apparent that the fittings 20 and 22 comprise hollow nipples 30 and 32 respectively. The nipple 30 is externally threaded preferably throughout its length and is secured as by a pair of fastening nuts 34 thereon to the end wall of the inflatable bag or sealer 12 in a fluid-tight manner. An additional locknut as at 36 may be further applied for this purpose. At its outer end, the nipple 30 has a coupling gland or bushing 38 by which the end of the conduit means 24 is detachably connected thereto.

The fitting 22 has a diametrically reduced externally threaded end portion 40 which projects into the other end wall of the inflatable sealer 12 and is secured thereto as by the clamping nuts 42. A passage or bore 44 extends through the fitting 22 from end-to-end thereof, this bore being diametrically enlarged as at 46 at its forward or outer end and is closed by the closure member or closure plug 48 having an externally threaded end portion 50. Conveniently, this plug may have an eye 52 therein by which the cable 26 comprising the moving means may be connected thereto. At the junction of the enlarged or counterbored portion 46 of the passage 44, there is provided a valve seat 54 with which cooperates a check valve such as a ball valve 56. The latter is spring urged against the seat as by a compression spring 58 which is shown in FIGURE 4 as being adjustably tensioned by means of a screw-threaded plug 60. Alternatively, the plug 48 may itself engage the spring and provide a tensioning means therefor.

As shown best in FIGURE 5, the fitting 22 is of a hexagonal configuration and is provided intermediate its ends with a plurality of discharge ports 62 each of which communicates with the counterbore 46 and with the interior of the hollow body 10 exteriorly of the inflatable sealer 12 and in that compartment of the hollow body which contains the area to be welded.

The operation of the device and the method of purging a hollow body at the area to be welded are as follows.

With the moving means connected to the fitting 22 and to the deflated sealer 12, and with the conduit means 24 connected to the other end of the deflated sealer, the assembly is moved into the hollow body until it is positioned properly with respect to the area to be welded. During this time, the check valve 56 is of course maintained closed by the action of its closing spring. With the sealer properly positioned, the control valve, not shown, is manipulated to effect a supply of an inert purging gas of any suitable character through the conduit means 24 and into the interior of the inflatable sealer 12. The pressure of this gas then inflates the sealer until it is radially expanded against the side and interior walls of the body 10, as shown in FIGURE 2, and thus forming a partition therein which divides the interior of the body into two compartments, one of which contains the area to be welded. With the device fully expanded, and the check valve 56 still being closed by the spring, there is no escape or loss of the purging gas and the device may remain in place for an indefinite period of time without the loss of gas. When it is desired to initiate the welding operation, the pressure of the purging gas within the inflatable sealer 12 is increased above the closing pressure of the valve spring 58. Consequently, the purging gas will then flow from the conduit means 24, through the inflatable sealer 12 and through the discharge valve assembly of the fitting 22, opening the check valve or pressure relief valve 56 and being discharged by the discharge ports 62 into the compartment containing the area to be welded. Owing to the presence of the pressure relief valve 56, a predetermined desired pressure will be maintained in the inflatable sealer 12 sufficient to maintain it in its inflated condition, while the purging gas is being continuously supplied to the area to be welded. Assuming that the latter has an opening therefrom, there is a continuous flow of the purging gas past the area to be welded during the welding operation.

After the welding operation has been terminated, the supply of purging gas is cut off whereupon the pressure relief valve 56 will close. Pressure within the inflatable sealer 12 may be released or vented back through the conduit means 24 through the previously mentioned pressure control valve, not shown. With the bag deflated, the device is then removed by pulling either upon the conduit means 24 or upon the moving means 26 to withdraw the apparatus from the hollow body.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to falling within the scope of the invention as claimed.

What is claimed as new is as follows:

1. A purging device for welding hollow bodies comprising a bag-like collapsible container having opposing end wall portions, said container constituting an inflatable sealer adapted for freely sliding in a hollow body when deflated and having a side wall portion intermediate and connecting the end wall portions, said side wall portion being adapted to sealingly engage the interior of a hollow body and form a gas-tight partition across said hollow body when inflated, moving means secured to one end wall portion of said container for bodily positioning it in a hollow body adjacent an area thereof to be welded, conduit means connected to the opposing end wall portion and communicating with the interior of said container for supplying an inert purging gas thereinto for inflating said container, and discharge means connected to the one end wall portion and communicating with the interior of the container for discharging said inert purging gas into said hollow body adjacent said area to be welded, said discharge means being operable for the discharge of gas at a pressure in excess of a predetermined pressure by which said container is inflated to assume a sealed position in the hollow body.

2. The combination of claim 1 wherein said discharge means comprises a pressure relief valve assembly communicating directly with the interior of said container and having discharge ports disposed exteriorly of said container.

3. The combination of claim 2 wherein said pressure relief valve assembly constitutes a part of said moving means.

4. The combination of claim 1 wherein said end wall portions of the container are provided with openings and a fitting is secured in each opening and freely communicates with the interior of the container, said conduit means and said moving means being each connected to one of said fittings.

5. The combination of claim 1 wherein said end wall portions of the container are formed with openings, a fitting mounted in said openings and freely communicating with the interior of the container, said conduit means being connected to and communicating with one of said fittings, the other of said fittings including a gas discharge valve assembly therein opening to the exterior of said sealer and comprising with said other fitting said discharge means.

6. The combination of claim 5 wherein said moving means is connected to said other fitting.

7. The combination of claim 1 wherein said discharge means comprises a nipple having a bore extending therethrough, said nipple having one end extending into and secured to the one end wall portion of said container said nipple being formed with a plurality of gas discharge ports intermediate the ends of the latter and communicating with said bore and disposed axially exteriorly of the one end wall portion of the container, a valve and valve seat in said bore controlling the flow of gas from said container through said discharge ports, a spring in said bore urging said valve to a closed position in said seat, a plug in the other end of said bore retaining said spring and valve in said bore and adjustably compressing said spring against said valve.

8. The combination of claim 7 wherein said moving means is connected to said plug.

9. A method of applying an inert purging gas to the interior of a hollow body at an area to be welded comprising the steps of
   (a) moving a bag-like collapsible container in a collapsed state within said hollow body to a position adjacent said area to be welded,
   (b) supplying an inert purging gas under a predetermined pressure to the interior of said container sufficient to inflate the latter whereby to form a gas-tight sealing partition in said hollow body at one side of said area to be welded,
   (c) while maintaining in said container the pressure sufficient to maintain the latter inflated, continuously discharging purging gas freely from said container into said hollow body at the area to be welded by increasing the pressure of the supplied gas above the predetermined pressure sufficient to maintain the container inflated,
   (d) welding said area while maintaining said container inflated and while continuing a discharge of said purging gas into said hollow body at the area to be welded until welding of the latter has been completed.

10. The method of claim 9 including the subsequent step of discontinuing the supplying of purging gas to said container and to said area to be welded after the welding has been completed and thereby deflating said container and then withdrawing said container bodily from said hollow body.

References Cited by the Examiner
UNITED STATES PATENTS

| | | | |
|---|---|---|---|
| 2,481,013 | 9/1949 | Henderson | 138—90 |
| 3,095,844 | 7/1963 | Thielsch | 228—42 |
| 3,194,466 | 7/1965 | Davis | 228—42 |

JOHN F. CAMPBELL, *Primary Examiner.*

M. L. FAIGUS, *Assistant Examiner.*